(12) United States Patent
Liao et al.

(10) Patent No.: US 12,466,909 B2
(45) Date of Patent: Nov. 11, 2025

(54) MODIFIED DICYCLOPENTADIENE-BASED RESIN

(71) Applicant: NAN YA PLASTICS CORPORATION, Taipei (TW)

(72) Inventors: Te-Chao Liao, Taipei (TW); Hung-Yi Chang, Taipei (TW); Yu-Ting Liu, Taipei (TW)

(73) Assignee: NAN YA PLASTICS CORPORTION, Taipei (TW)

( * ) Notice: Subject to any disclaimer, the term of this patent is extended or adjusted under 35 U.S.C. 154(b) by 512 days.

(21) Appl. No.: 18/178,547

(22) Filed: Mar. 6, 2023

(65) Prior Publication Data

US 2024/0166788 A1 May 23, 2024

(30) Foreign Application Priority Data

Nov. 3, 2022 (TW) .................. 111141997

(51) Int. Cl.
*C08F 232/08* (2006.01)

(52) U.S. Cl.
CPC .................. *C08F 232/08* (2013.01)

(58) Field of Classification Search
None
See application file for complete search history.

(56) References Cited

U.S. PATENT DOCUMENTS

| | | | | |
|---|---|---|---|---|
| 4,500,470 A | * | 2/1985 | Wilson | ............ C02F 5/14 |
| | | | | 210/698 |
| 5,587,007 A | * | 12/1996 | Curvin | ............ C08G 63/553 |
| | | | | 528/295.3 |
| 2015/0353722 A1 | * | 12/2015 | You | ............ C08L 79/04 |
| | | | | 523/438 |

FOREIGN PATENT DOCUMENTS

| | | |
|---|---|---|
| JP | 2018184578 | 11/2018 |
| JP | 2022108705 | 7/2022 |
| KR | 20170038312 | 4/2017 |
| TW | 321139 | 3/2010 |

OTHER PUBLICATIONS

"Office Action of Taiwan Counterpart Application", issued on Jul. 10, 2023, p. 1-p. 6.
"Office Action of Japan Counterpart Application", issued on May 30, 2024, p. 1-p. 3.

* cited by examiner

*Primary Examiner* — Christopher M Rodd
(74) *Attorney, Agent, or Firm* — JCIPNET

(57) ABSTRACT

A modified dicyclopentadiene-based resin is provided. The modified dicyclopentadiene-based resin is formed from a dicyclopentadiene-based resin having an amino group, a phenol and a polyoxymethylene by a cyclization reaction. The dicyclopentadiene-based resin having an amino group is formed by nitration reaction and hydrogenation reaction of dicyclopentadiene phenolic resin.

10 Claims, No Drawings

MODIFIED DICYCLOPENTADIENE-BASED RESIN

CROSS-REFERENCE TO RELATED APPLICATION

This application claims the priority benefit of Taiwan application serial no. 111141997, filed on Nov. 3, 2022. The entirety of the above-mentioned patent application is hereby incorporated by reference herein and made a part of this specification.

BACKGROUND

Technical Field

The invention relates to a dicyclopentadiene (DCPD-based resin, particularly to a modified dicyclopentadiene-based resin for which the structure includes a benzoxazine group.

Description of Related Art

Dicyclopentadiene-based resins have good insulation, corrosion resistance, dielectric constant (Dk) and dissipation factor (Df) and other characteristics, so it is usually applied in shipbuilding, automotive industry, optics, electronic products and other fields that require high temperature coatings. However, the dielectric properties of the currently used dicyclopentadiene-based resins limit their application to insulating materials for electronic substrates such as high frequency printed circuit boards.

SUMMARY

The invention provides a modified dicyclopentadiene-based resin capable of providing good dielectric properties and heat resistance.

A modified dicyclopentadiene-based resin of the invention is formed from a dicyclopentadiene-based resin having an amino group, a phenol and a polyoxymethylene (POM) by a cyclization reaction. The dicyclopentadiene-based resin having an amino group is formed by nitration reaction and hydrogenation reaction of dicyclopentadiene phenolic resin.

In an embodiment of the invention, a weight average molecular weight of the dicyclopentadiene phenolic resin is 400 to 2,000.

In an embodiment of the invention, a structure of the modified dicyclopentadiene-based resin has at least two benzoxazine groups.

In an embodiment of the invention, a ratio of a mole number of the dicyclopentadiene phenolic resin, a mole number of the phenol to a mole number of the polyoxymethylene is 1:1:2 to 1:2:4.

In an embodiment of the invention, a weight average molecular weight of the modified dicyclopentadiene-based resin is 800 to 20,000.

A modified dicyclopentadiene-based resin of the invention has a structure represented by Formula (1) as follows:

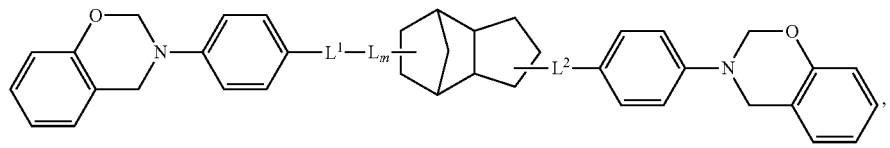

Formula (1)

in Formula (1), L represents a dicyclopentadienylene group, a divalent organic group derived from a phenol-based compound or a combination thereof, $L^1$ and $L^2$ each represent a divalent organic group derived from a phenol-based compound, and, m represents an integer from 0 to 10.

In an embodiment of the invention, a precursor of the modified dicyclopentadiene-based resin includes a dicyclopentadiene phenolic resin. A weight average molecular weight of the dicyclopentadiene phenolic resin is 400 to 2,000.

In an embodiment of the invention, the phenol-based compound includes phenol.

In an embodiment of the invention, the L represents

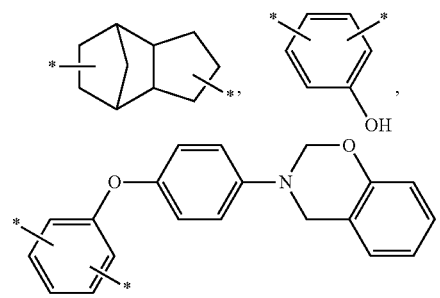

or a combination thereof, and * represents a bonding position.

In an embodiment of the invention, the $L^1$ and $L^2$ each represent

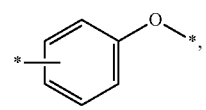

and * represents a bonding position.

Based on the above, the invention provides a dicyclopentadiene-based resin for which the structure has a benzoxazine group, which has good dielectric properties and heat resistance.

To make the features and advantages of the disclosure to be comprehended more easily, embodiments are described in detail as follows.

DESCRIPTION OF THE EMBODIMENTS

The following are embodiments describing the content of the invention in detail. The implementation details provided in the embodiments are for illustrative purposes, and are not intended to limit the scope of protection of the content of the invention. Those with ordinary knowledge in the art may modify or change these implementation details according to the needs of the actual implementation.

The "divalent organic group" as used in the specification is an organic group having two bonding positions. And the "divalent organic group" may form two chemical bonds through these two bonding positions.

The invention provides a modified dicyclopentadiene-based resin formed from a dicyclopentadiene-based resin having an amino group, a phenol and a polyoxymethylene by a cyclization reaction, wherein the dicyclopentadiene-based resin having an amino group is formed by nitration reaction and hydrogenation reaction of dicyclopentadiene phenolic resin.

A structure of the modified dicyclopentadiene-based resin of the invention has a benzoxazine group, preferably has at least two benzoxazine groups, more preferably has at least three benzoxazine groups. For example, the benzoxazine group may bond on a terminal (e.g. terminal on both sides) and/or a branch of the modified dicyclopentadiene-based resin, preferably bond on terminal on both sides and the branch of the resin. More preferably, after the dicyclopentadiene phenolic resin finished the reaction, hydroxyl groups of all phenol groups in a structure thereof are substituted to benzoxazine groups. That is, a structure of the modified dicyclopentadiene-based resin does not have hydroxyl group. Thus, the modified dicyclopentadiene-based resin have good dielectric properties and heat resistance.

A weight average molecular weight of the dicyclopentadiene phenolic resin is 400 to 2,000, preferably 400 to 1,000. For example, specific examples of commercially available products of dicyclopentadiene resin having a phenol group may include ERM6105 (trade name; manufactured by SONGWON Co., Ltd.; weight average molecular weight: 800), ERM6115 (trade name; manufactured by SONGWON Co., Ltd.; weight average molecular weight: 1,100), ERM6140 (trade name; manufactured by SONGWON Co., Ltd.; weight average molecular weight: 1,300) or other suitable dicyclopentadiene phenolic resin.

<Preparation Method of Modified Dicyclopentadiene-Based Resin>

First, the dicyclopentadiene-based resin having an amino group is formed by performing a dicyclopentadiene phenolic resin to nitration reaction and hydrogenation reaction. The method of nitration reaction and hydrogenation reaction of the dicyclopentadiene phenolic resin is not particularly limited, for example, well-known nitration reaction and hydrogenation reaction may be performed, which will not be described in detail here. In this embodiment, the hydrogenation reaction may be performed in a solvent of tetrahydrofuran, toluene, isopropanol, dimethylacetamide, or a combination thereof, preferably performed in a solvent of dimethylacetamide. For example, in a mixed solvent of toluene and isopropanol, a volume ratio of toluene to isopropanol may be 80:20 to 100:0. In a mixed solvent of dimethylacetamide and toluene, a volume ratio of dimethylacetamide to toluene may be 75:25 to 100:0. Thereby, the hydrogenation reaction may achieve a good hydrogenation rate, for example, which may be 90% or more, more preferably 98% or more). Next, the dicyclopentadiene-based resin having an amino group, a phenol and a polyoxymethylene are performed to a cyclization reaction to form a modified dicyclopentadiene-based resin. In this embodiment, the cyclization reaction may be performed in a solvent of toluene, ethanol, dimethylacetamide, or a combination thereof, preferably performed in a solvent of dimethylacetamide. For example, in a mixed solvent of toluene and ethanol, a volume ratio of toluene to ethanol may be 60:40 to 100:0. In this embodiment, a ratio of a mole number of the dicyclopentadiene phenolic resin, a mole number of the phenol to a mole number of the polyoxymethylene is 1:1:2 to 1:2:4, preferably 1:1:2 to 1:1.5:3.

The modified dicyclopentadiene-based resin has a structure represented by Formula (1) as follows. In this embodiment, a weight average molecular weight of the modified dicyclopentadiene-based resin is 800 to 20,000, preferably 800 to 5,000.

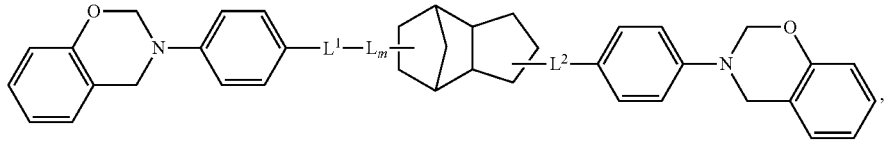

Formula (1)

In Formula (1), L represents a dicyclopentadienylene group, a divalent organic group derived from a phenol-based compound or a combination thereof, preferably a combination of the dicyclopentadienylene group and the divalent organic group derived from the phenol-based compound, and the divalent group is preferably a divalent group including a benzoxazine group;

$L^1$ and $L^2$ each represent a divalent organic group derived from a phenol-based compound; and m represents an integer from 0 to 10, preferably an integer from 0 to 5.

In this embodiment, the phenol-based compound may include phenol. L, L' and L 2 may represent a divalent group derived from phenol. In this embodiment, L may represent

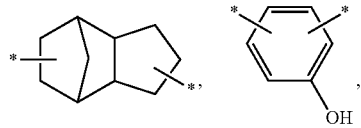

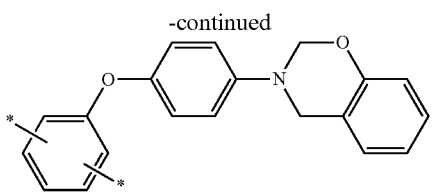

or a combination thereof, preferably a combination of

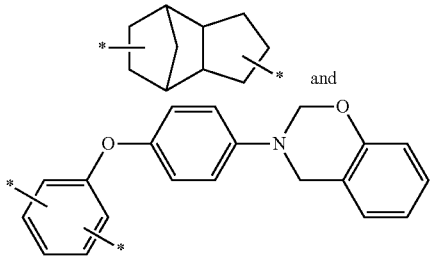

represents a bonding position. $L^1$ and $L^2$ may each represent

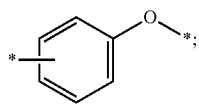

* represents a bonding position.

In this embodiment, the modified dicyclopentadiene-based resin has a structure represented by Formula (2) as follows. In this embodiment, the modified dicyclopentadiene-based resin may also be a modified benzoxazine (BX) resin, a modified multi-benzoxazine resin or a benzoxazine resin modified by dicyclopentadiene (abbreviated as DCPD-BX).

In formula (2), m represents an integer from 0 to 10, preferably an integer from 0 to 5.

Examples of Modified Dicyclopentadiene-Based Resin

Example 1 to Example 3 of the modified dicyclopentadiene-based resin are described below:

Example 1

Dicyclopentadiene phenolic resin including 1 mole hydroxyl group (trade name: ERM6105, manufactured by SONGWON Co., Ltd.; weight average molecular weight: 800) was added in 6 mole of dimethylacetamide (DMAC) to dissolve therein. Next, 1.25 mole of potassium carbonate and 1.25 mole of 4-fluoronitrobenzene were added thereto, and reacted at a temperature of 120° C. for 5 hours, and then cooled to room temperature. Then, filtration was performed to remove solids, followed by precipitation with a mixed solution of methanol and water to obtain a precipitate of nitrated dicyclopentadiene phenolic resin (DCPD-NO$_2$). Next, the precipitate was added to dimethylacetamide, and reacted at a temperature of 90° C. for 8 hours to perform a hydrogenation reaction and obtain a dicyclopentadiene-based resin having an amino group (DCPD-NH$_2$). Then, the dicyclopentadiene-based resin having an amino group, 1 mole of phenol and 2 mole of polyoxymethylene were added to dimethylacetamide, and reacted at a temperature of 80° C. for 8 hours. The modified dicyclopentadiene-based resin of Example 1 was obtained, whose structure has benzoxazine groups bonded to the terminal of both sides and branches of the structure (DCPD-BX) and may have a structure represented by Formula (2) (m representing an integer from 0 to 6). The obtained modified dicyclopentadiene-based resin was evaluated by each of the following evaluation methods, and the results thereof are as shown in Table 1.

Example 2

The modified dicyclopentadiene-based resin of Example 2 was prepared using the same steps as Example 1, and the Formula (2)

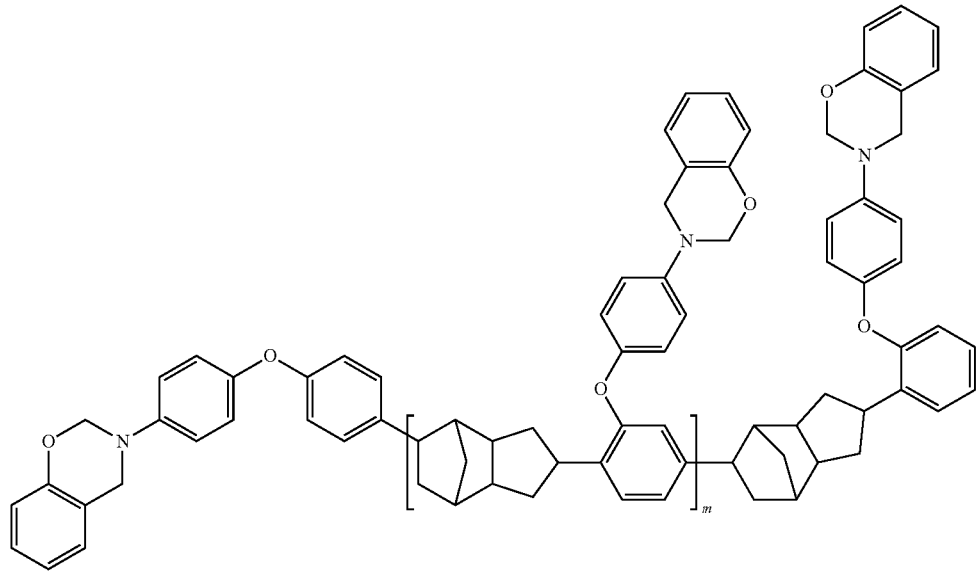

difference thereof is: changing to use dicyclopentadiene phenolic resin (trade name: ERM6115, manufactured by SONGWON Co., Ltd.; weight average molecular weight: 1,100) as reactant. The obtained modified dicyclopentadiene-based resin (which may have a structure represented by Formula (2), and wherein m represents an integer from 0 to 8) was evaluated by each of the following evaluation methods, and the results thereof are as shown in Table 1.

Example 3

The modified dicyclopentadiene-based resin of Example 3 was prepared using the same steps as Example 1, and the difference thereof is: changing to use dicyclopentadiene phenolic resin (trade name: ERM6140, manufactured by SONGWON Co., Ltd.; weight average molecular weight: 1,300) as reactant. The obtained modified dicyclopentadiene-based resin (which may have a structure represented by Formula (2), and wherein m represents an integer from 0 to 10) was evaluated by each of the following evaluation methods, and the results thereof are as shown in Table 1.

TABLE 1

|  | Example 1 | Example 2 | Example 3 |
| --- | --- | --- | --- |
| Weight average molecular weight of dicyclopentadiene phenolic resin | 800 | 1,100 | 1,300 |
| Dielectric constant (Dk) | 4.0 | 3.8 | 3.5 |
| Dissipation factor (Df) | 0.0048 | 0.0046 | 0.0040 |
| Tg (unit: ° C.) | 280 | 264 | 232 |
| Peel strength (unit: lb/in) | 5.8 | 5.5 | 5.0 |

<Evaluation Methods>
a. Dielectric Constant (Dk)

The prepared modified dicyclopentadiene-based resin was coated on a substrate, and baked at a temperature of 120° C. for 2 minutes, and then hot pressed at a temperature of 210° C. for 3 hours to form a film with thickness of 100 µm. Next, the film was measured for a dielectric constant (Dk) at a frequency of 10 GHz via a dielectric analyzer (model: E4991A; manufactured by Agilent Technologies, Inc.). When the dielectric constant is smaller, the modified dicyclopentadiene-based resin has good dielectric property.

b. Dissipation Factor (Df)

The prepared modified dicyclopentadiene-based resin was coated on a substrate, and baked at a temperature of 120° C. for 2 minutes, and then hot pressed at a temperature of 210° C. for 3 hours to form a film with thickness of 100 µm. Next, the film was measured for a dissipation factor (Df) at a frequency of 10 GHz via a dielectric analyzer (model: E4991A; manufactured by Agilent Technologies, Inc.). When the dissipation factor is smaller, the modified dicyclopentadiene-based resin has good dielectric property.

c. Glass Transition Temperature (Tg)

The prepared modified dicyclopentadiene-based resin was measured for a glass transition temperature (Tg) via a dynamic mechanical analyzer (DMA). When the Tg is greater, the modified dicyclopentadiene-based resin has good resistance to phase changes, that is, good heat resistance.

Heating rate: 10° C./min
Temperature range: 30° C. to 300° C. (heating, cooling, heating)

d. Peel Strength

The prepared modified dicyclopentadiene-based resin was coated on a substrate, and baked at a temperature of 120° C. for 2 minutes to form a resin film. Then, copper foils were laminated on an upper surface and a lower surface of the resin film, and hot pressed at a temperature of 210° C. for 3 hours to form a film with thickness of 200 µm. Next, the film was measured for a peel strength via a universal tensile machine. When the peel strength is greater, the modified dicyclopentadiene-based resin has good resistance to peeling from the substrate, that is, good peel resistance.

<Evaluation Results>

It may be seen from Table 1 that when the modified dicyclopentadiene-based resin has a structure having a benzoxazine group, and a number of benzoxazine group is at least 3 (that is, the terminal of both sides and a branch of the resin have benzoxazine group) (Examples 1-3), the modified dicyclopentadiene-based resin has good heat resistance, peel resistance and dielectric properties at the same time.

In addition, compared to the modified dicyclopentadiene-based resin obtained by using the dicyclopentadiene phenolic resin with a larger weight average molecular weight as the precursor, the modified dicyclopentadiene-based resin obtained by using the dicyclopentadiene phenolic resin with a smaller weight average molecular weight as the precursor has greater glass transition temperature and greater peel strength, that is, better heat resistance and peel resistance, and good dielectric properties at the same time.

In addition, compared to the modified dicyclopentadiene-based resin obtained by using the dicyclopentadiene phenolic resin with a smaller weight average molecular weight as the precursor, the modified dicyclopentadiene-based resin obtained by using the dicyclopentadiene phenolic resin with a larger weight average molecular weight as the precursor has smaller dielectric constant and smaller dissipation factor, that is, better dielectric properties, and good heat resistance and peel resistance at the same time.

Based on the above, the modified dicyclopentadiene-based resin of the invention is formed from a dicyclopentadiene-based resin having an amino group, a phenol and a polyoxymethylene by a cyclization reaction, for which the structure has a benzoxazine group, so it has good heat resistance, peel resistance and dielectric properties. Therefore, the modified dicyclopentadiene-based resin has good applicability.

Although the invention has been disclosed in the embodiments above, they are not intended to limit the invention. Anyone with ordinary knowledge in the relevant technical field can make changes and modifications without departing from the spirit and scope of the invention. The scope of protection of the invention shall be subject to those defined by the claims attached.

What is claimed is:

1. A modified dicyclopentadiene-based resin, formed from a dicyclopentadiene-based resin having an amino group, a phenol and a polyoxymethylene by a cyclization reaction,
wherein the dicyclopentadiene-based resin having an amino group is formed by nitration reaction and hydrogenation reaction of dicyclopentadiene phenolic resin.

2. The modified dicyclopentadiene-based resin according to claim 1, wherein a weight average molecular weight of the dicyclopentadiene phenolic resin is 400 to 2,000.

3. The modified dicyclopentadiene-based resin according to claim 1, a structure thereof has at least two benzoxazine groups.

4. The modified dicyclopentadiene-based resin according to claim 1, wherein a ratio of a mole number of the dicyclopentadiene phenolic resin, a mole number of the phenol to a mole number of the polyoxymethylene is 1:1:2 to 1:2:4.

5. The modified dicyclopentadiene-based resin according to claim 1, a weight average molecular weight thereof is 800 to 20,000.

6. A modified dicyclopentadiene-based resin, having a structure represented by Formula (1) as follows:

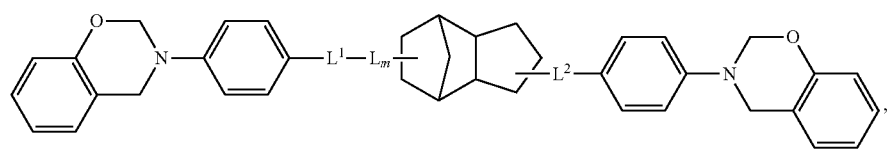

Formula (1)

in Formula (1), L represents a dicyclopentadienylene group, a divalent organic group derived from a phenol-based compound or a combination thereof, $L^1$ and $L^2$ each represent a divalent organic group derived from a phenol-based compound, and m represents an integer from 0 to 10.

7. The modified dicyclopentadiene-based resin according to claim 6, a precursor thereof comprising a dicyclopentadiene phenolic resin, a weight average molecular weight of the dicyclopentadiene phenolic resin is 400 to 2,000.

8. The modified dicyclopentadiene-based resin according to claim 6, wherein the phenol-based compound comprises phenol.

9. The modified dicyclopentadiene-based resin according to claim 6, wherein L represents

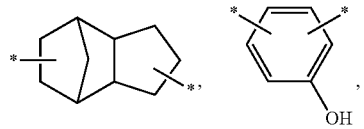

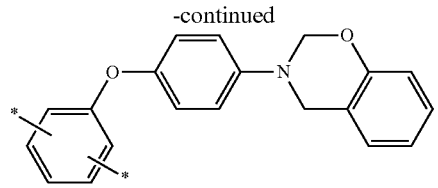

or a combination thereof, and * represents a bonding position.

10. The modified dicyclopentadiene-based resin according to claim 6, wherein $L^1$ and $L^2$ each represent

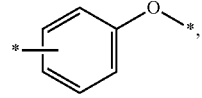

and * represents a bonding position.

* * * * *